(12) United States Patent
Kilger et al.

(10) Patent No.: US 7,490,052 B2
(45) Date of Patent: *Feb. 10, 2009

(54) PROCESS AND SYSTEM FOR INTEGRATING INFORMATION FROM DISPARATE DATABASES FOR PURPOSES OF PREDICTING CONSUMER BEHAVIOR

(75) Inventors: Max F. Kilger, Boca Raton, FL (US); William E. Engel, Delray Beach, FL (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/361,751

(22) Filed: Feb. 23, 2006

(65) Prior Publication Data

US 2006/0143073 A1 Jun. 29, 2006

Related U.S. Application Data

(63) Continuation of application No. 09/610,704, filed on Jul. 6, 2000, now Pat. No. 7,035,855.

(51) Int. Cl.
*G06Q 10/00* (2006.01)
(52) U.S. Cl. ............................................. 705/10
(58) Field of Classification Search ................ 705/10
See application file for complete search history.

(56) References Cited

U.S. PATENT DOCUMENTS

| | | | | |
|---|---|---|---|---|
| 4,908,761 A | * | 3/1990 | Tai | 705/14 |
| 5,548,749 A | * | 8/1996 | Kroenke et al. | 707/102 |
| 5,675,662 A | * | 10/1997 | Deaton et al. | 382/137 |
| 5,819,226 A | * | 10/1998 | Gopinathan et al. | 705/44 |
| 5,884,305 A | * | 3/1999 | Kleinberg et al. | 707/6 |
| 5,974,396 A | * | 10/1999 | Anderson et al. | 705/10 |
| 6,073,112 A | * | 6/2000 | Geerlings | 705/14 |

OTHER PUBLICATIONS

"Database marketing predicts customer loyalty" by Sarah Verney, Datamation, Sep. 1996.*
"Database marketing: a new approach to the old relationships" (Ernst and Young's Survey of Retail Information Technology Expenses and Trends), Chain Store Age Executive with Shopping Center Age, v67, n9, Sep. 1991.*
"An Introduction to Data Warehousing" by Vivek Gupta, System Services Corporation, white paper adapted from book of Data Warehousing with MS SQL Server, Aug. 1997.*
"Data Mining-An Industrial Research Perspective" by C. Apte, IEEE Computational Science and Engineering, Apr.-Jun. 1997.*

* cited by examiner

*Primary Examiner*—Jonathan G Sterrett
(74) *Attorney, Agent, or Firm*—Nancy R. Gamburd; Gamburd Law Group LLC

(57) ABSTRACT

A process and system for integrating information stored in at least two disparate databases. The stored information includes consumer transactional information. According to the process and system, at least one qualitative variable which is common to each database is identified, and then transformed into one or more quantitative variables. The consumer transactional information in each database is then converted into converted information in terms of the quantitative variables. Thereafter, an integrated database is formed for predicting consumer behavior by combining the converted information from the disparate databases.

35 Claims, 9 Drawing Sheets

PROCESS AND SYSTEM FOR INTEGRATING INFORMATION FROM DISPARATE DATABASES FOR PURPOSES OF PREDICTING CONSUMER BEHAVIOR

CROSS-REFERENCE TO RELATED APPLICATIONS

This application is a continuation of and claims priority to U.S. patent application Ser. No. 09/610,704, filed Jul. 6, 2000, now U.S. Pat. No. 7,035,855 entitled "Process and System for Integrating Information from Disparate Databases for Purposes of Predicting Consumer Behavior", the content of which is incorporated by reference herein, with priority claimed for all commonly disclosed subject matter; which further claims priority to and the benefit of co-pending U.S. patent application Ser. No. 09/476,729, entitled "Method and System for Aggregating Consumer Information", filed Dec. 30, 1999, which claims priority to and the benefit of U.S. Provisional Patent Application Ser. No. 60/114,290, filed on Dec. 30, 1998 and U.S. Provisional Patent Application Ser. No. 60/129,484, filed on Apr. 15, 1999, which applications are incorporated herein by reference.

FIELD OF THE INVENTION

The present invention relates to a process and system for integrating information from disparate databases for purposes of predicting consumer purchasing behavior. In particular, the process and system utilizes distinct purchasing patterns to form unique shopping clusters that are common across the databases to be integrated. These shopping clusters are then used to more accurately predict consumer behavior.

BACKGROUND OF THE INVENTION

Generally, despite the advancement of the Internet which allows for the transfer and processing of great amounts of information, it is still difficult for companies to accumulate, process and analyze the necessary information to accurately predict a consumer's purchasing behavior. Typically, there are two types of information which are used for this purpose, namely personal information and demographic information. Personal information includes the name, address and telephone number of a particular customer, and preferably his or her social security number. Demographic information may contain a customer's county of residence, the income range (e.g., $30,000 to $35,000), the highest level of education achieved (e.g., a college degree), and similar non-personal identifiable consumer information.

The collection of this type of consumer information and the use of it to predict consumer purchasing behavior is important to merchants because it enables merchants to improve the stocking of their inventory, plan better locations for their stores, and more effectively advertise and market their goods and services. The company which is best able to collect and synthesize the highest amount of consumer information will likely be the company which is best able to predict consumer behavior and thus generate the most sales.

Predictably, although merchants today are able to determine much useful information about their own customers, what they cannot readily obtain is information about customers who shop at their competitors' stores and/or other merchants within their business category.

Thus, merchants generally turn to marketing and/or consulting agencies to collect and analyze on the merchant's behalf consumer personal and demographic information from a variety of sources. It becomes extremely important how well such information can be gathered, collated and analyzed so that it can be an accurate predictor of consumer behavior. Presently, companies request and receive demographic information from many vendors and/or even credit issuing agencies, which all have such information stored in their respective databases. There are various methods in existence which attempt to effectively integrate the information received from the disparate databases.

For instance, one of such methods, referred to as the "fusion" method, simply assigns to all those individuals falling within the same "demographic characteristics" with the same "consumer and media behavior" (e.g., likely to purchase Coca-Cola or some other designated product). Using this fusion method, for example, an individual listed in one merchant's database A who is Hispanic, aged 25 to 34, with a high school education, and earning between $30,000 and $35,000, is "matched" with another individual in another merchant's database B who has some or all of these same demographic characteristics. These matched individuals are then assigned to the same "consumer and media behavior."

Another conventional technique, called a "geo-matching" method, groups all individuals having the same or adjacent geographical location (e.g., a zip code, a census block, etc.) and assigns these individuals the identical "consumer and media behavior."

Although these techniques are still widely used in other parts of the world, they have become disfavored in the United States due to the discovered weak correlation between the general variables (i.e., the demographic characteristics information) and the actual behavior on the part of the consumer. Thus, the above-described prior art techniques of integrating and utilizing demographic information from two or more disparate databases has provided a very limited success in predicting consumer and media behavior.

Accordingly, there is a need for a way to better utilize consumer purchasing information existing in disparate databases to more accurately predict the purchasing behavior of consumers.

SUMMARY OF THE INVENTION

The present invention accomplishes this objective. Rather than relying upon demographic characteristics to predict consumer purchasing behavior, the present invention recognizes distinct purchasing patterns to form unique shopping clusters that are common across disparate databases. This more direct approach produces a much more powerful and accurate model of consumer behavior.

In accordance with one embodiment of the invention, there is provided a process and system for integrating information stored in at least two disparate databases. The stored information includes consumer transactional information. According to the process and system, at least one qualitative variable which is common to each database is identified, and then transformed into one or more quantitative variables. The consumer transactional information in each said database is then converted into converted information in terms of the quantitative variables. Thereafter, an integrated database is formed for predicting consumer behavior by combining the converted information from the disparate databases.

In one exemplary embodiment of the present invention, the databases contain information about consumers' actual purchasing behavior. For example, one database can include MasterCard credit card transactions.

The identified qualitative variables in each of the databases measure the same or similar behaviors or characteristics. For instance, one variable could be "merchants," and the behavior that is measured could be purchasing activities at each of these merchants. The qualitative variable described above may be "I shopped at Macy's," which is transformed (or "bloomed") into the quantitative variable which may be "I shopped at a store where the mean number of transactions per customer is 10.2 and the mean transaction amount is $28.12". Preferably, there are other quantitative "blooming variables" which are used, such as the mean household income of a shopper at a particular merchant. "Variable blooming" in effect "widens" the narrow base of connectivity between the two databases. Instead of relying on a simple qualitative variable based upon the presence or absence of shopping or purchasing behavior at a specific merchant, variable blooming allows the use of quantitative variables so that database interconnectivity utilizes multiple, substantively interpretable, indicators possessing a higher level of measurement.

According to another embodiment of the present invention, the blooming variables of each of the databases may be standardized and each instance of purchasing behavior can be recoded or converted in terms of the bloomed variables. For example, a MasterCard transaction in the MasterCard database that revealed that a cardholder had made a $32.28 transaction at Macy's was transformed into a datapoint that was described as a $32.28 charge at a merchant where the mean number of transactions was 10.2, the mean transaction amount per purchase was $28.12, the mean household income of a shopper at that merchant was $54,282 and the proportion of shoppers for each "Nielsen" county size A, B, C and D (as that term is readily understood by those skilled in the art) was 0.52, 0.32, 0.12 and 0.06 respectively.

In a preferable embodiment of the present invention, prior to forming the integral database from two separate databases, the database datapoints are weighted depending upon the time period of transactions separating the databases as well as the number of transactions in each.

In yet another embodiment, "statistical drivers" are selected from the variable or variables. For example, if the variable is "merchants," then a statistical driver would be a subset of the merchants that had the most discriminatory power—those that would have more discriminating shoppers (e.g., department stores rather than grocery stores). Preferably, this is done by first identifying the industries where it is thought there might be merchants that would best discriminate shoppers and then grouping selected merchants within such industries into "clusters." This latter grouping step preferably comprises generating a "preliminary cluster dataset" and evaluating this preliminary dataset (comprising, for example, a group of merchants) to insure that it meets a minimum threshold of reliability. This can be achieved by use of statistical analysis known by those skilled in the art. Resulting from this analysis "statistical drivers" are selected.

In yet another embodiment of the present invention, the optimum and/or exact number of clusters to use in the "final cluster solution" in predicting consumer behavior, and each consumer (or respondent) in the database is assigned to one of the mutually exclusive shopping clusters. Determining the exact number of clusters n to use can be accomplished by using statistical procedures known in the art. Preferably, if a respondent in the combined database did not shop at any of the "statistical driver" merchants, then they are excluded from the "final cluster solution" and assigned a special cluster number, e.g., 0, indicating that they were not assigned to one of the final clusters n.

Furthermore, it is also possible to convert the optimum number of clusters into "super clusters", and assign each cluster and all of its members to one and only one supercluster. Thereafter, the super clusters and the shopping behavior revealed therein can be utilized to more accurately predict consumer purchasing behavior.

Because of the much stronger correlation between a consumer's actual behavior and a consumer's predictable behavior than between demographics and a consumer's predictable behavior, the present invention provides a more powerful resource to more accurately predict consumer purchasing behavior.

In addition, the databases to be integrated can be updated, and a respondent who previously was assigned in cluster 0 but who subsequently shopped in one or more of the "statistical drivers" can be assigned to a cluster according to a "nearest neighbor" strategy which dictates that the respondent be assigned to the cluster whose value was nearest the respondent's transaction in terms of the blooming variables.

In yet another preferred embodiment of the invention, once the consumer shopping clusters have been formed, "descriptors" (which are consumer-characteristics other than the statistical drivers) can be utilized to further describe the clusters, i.e., to help "color in" the complete picture of the consumer and media behaviors of the individuals comprising each of the integrated databases.

Accordingly, a process and system is provided for integrating information from disparate databases for purposes of more effectively predicting consumer purchasing behavior. More specifically, using the process and system of the present invention, it is now possible to effectively integrate consumer transactional databases with other consumer shopping and/or media self-reporting databases, for the purpose of classifying consumer patterns and identifying homogeneous segments of consumers in terms of their consumer and media behavior. Significantly, although the invention was developed using specific databases, the invention can be applied generically to many other market research databases. The advantage recognized and achieved is that utilizing the information concerning what consumers are buying or watching or doing, the present invention is better able to predict what consumers are likely to buy, watch or do in the future.

The process and system of the present invention, therefore, can be used to effectively develop strategic marketing plans for advertising agencies, retailers, network and cable television, as well as for new media and consumer channels such as the Internet. These plans may target shopping clusters through media campaigns of all types, including but not limited to cooperative marketing agreements among retailers and media providers.

BRIEF DESCRIPTION OF THE DRAWINGS

Exemplary embodiments of the present invention will now be described in detail with reference to the accompanying drawings in which.

DETAILED DESCRIPTION

Figure 1:
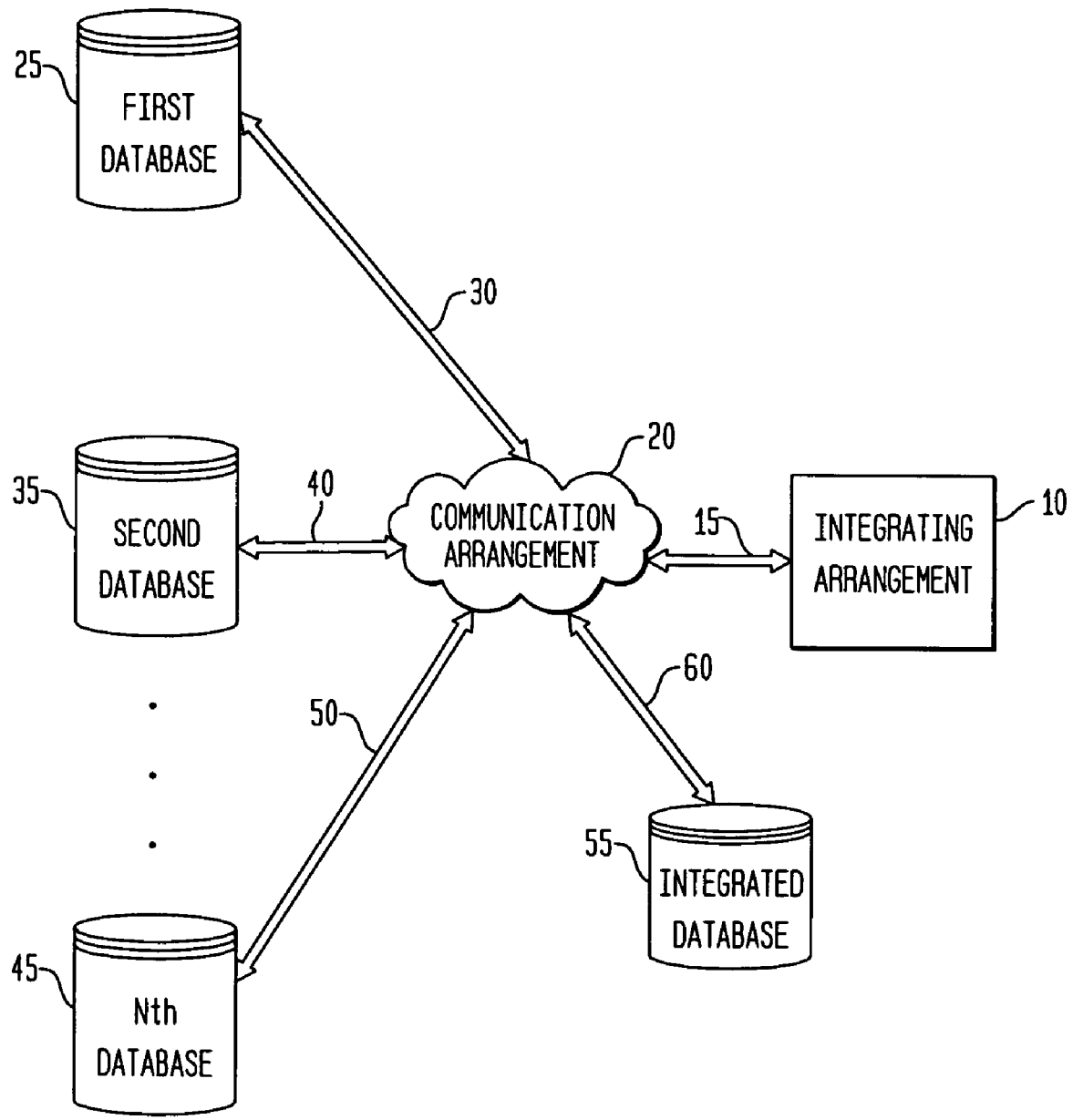
FIG. 1 shows a diagram of an exemplary embodiment of a system according to the present invention.

FIG. 1 shows a diagram of an exemplary embodiment of a system according to the present invention which integrates information from at least two disparate databases for predicting consumer behavior.

In particular, an integrating arrangement 10 of the present invention is connected to a communication network 20 via a first connection 15. The communication arrangement 20 can be a local area network, a wide area network, the Internet, an Intranet, etc. A first database 25, a second database 35, ... an $N^{th}$ database 45 (containing information about consumer purchasing behavior) and an integrated database 55 are connected to the communication network 20 via a second connection 30, a third connection 40, a fourth connection 50, and a fifth connection 60, respectively. For example, at least one of the databases 25, 35, 45 may contain information regarding the transactions of the customers of a credit issuing agency or of a merchant (e.g., MasterCard International Incorporated—"MasterCard"—customer transactions), and other databases of the second and $N^{th}$ databases may contain similar information or non-transactional information regarding, e.g., particular shopping and product patterns provided by respondents using a national survey (e.g., a Simmons database known in the trade). The databases 25, 35, 45 can be provided in separate storage devices, or on the same storage device. Such storage device (or devices) may be provided remotely from the integrating arrangement 10, or within the integrating arrangement 10.

Figure 2:
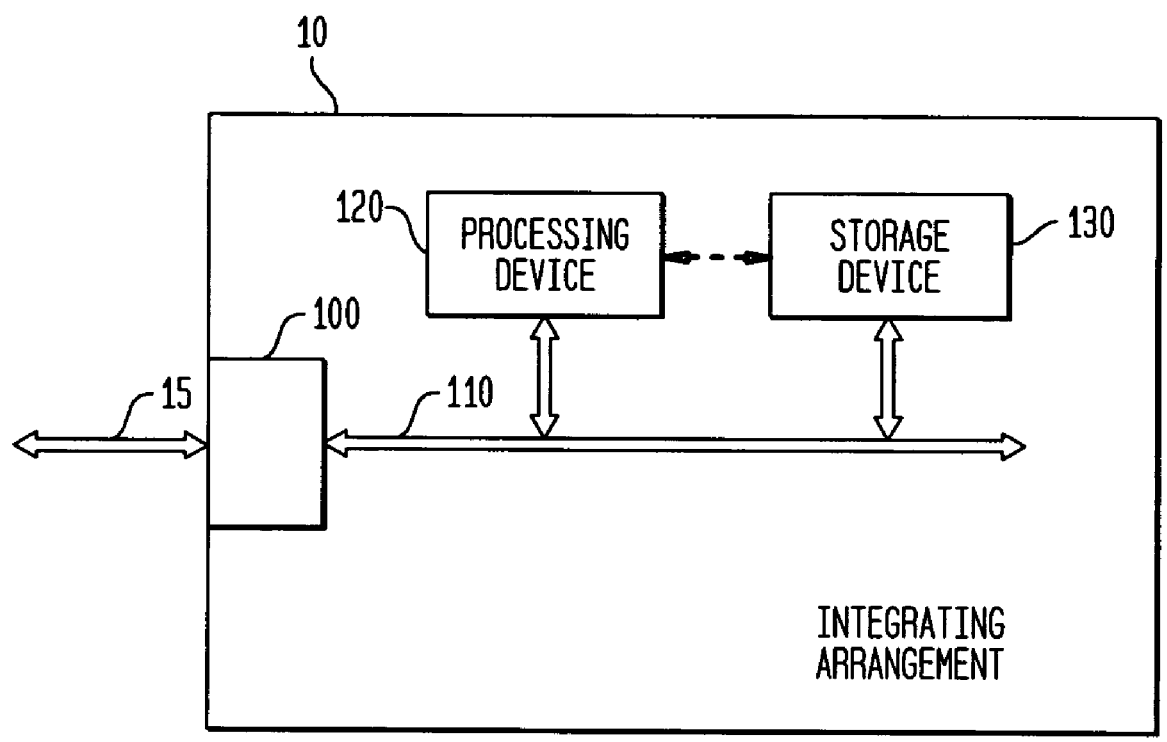
FIG. 2 shows a diagram of an exemplary embodiment of the integrating arrangement of the system illustrated in FIG. 1.

FIG. 2 shows an illustration of the exemplary embodiment of the integrating arrangement 10 according to the present invention, in which the integrating arrangement 10 includes a communications device 100 (e.g., a communications card, a network card, etc.), a processing device 120 (e.g., a microprocessor) and a storage device 130 (e.g., a hard drive, a RAM device, etc.). It is conceivable that other devices may also be included in the integrating arrangement 10 but are not described herein. The communications device 100, the processing device 120 and the storage device 130 are interconnected via a bus arrangement 110. It is also possible that the processing device 120 may be directly connected to the storage device 130 to avoid transmitting the data to the storage device 130 via the bus arrangement 110. In operation, the data provided from the databases 25, 35, 45, 55 are received at and/or transmitted from the communications device 100. This data is then provided to the processing device 120 via the bus arrangement 110 to be analyzed, integrated/merged and possibly clustered. The integrated and/or clustered data can be stored by the processing device 120 on the storage device 130 either directly or via the bus arrangement 110. It is also conceivable that this integrated and/or clustered data may be transmitted to other storage devices via the communications device 100, the first connection 15 and the communications arrangement 20 which may be separately provided from the integrating arrangement 10. It is conceivable that one or more of the databases 25, 35, 45, 55 may reside on the storage device 130.

Figure 3:
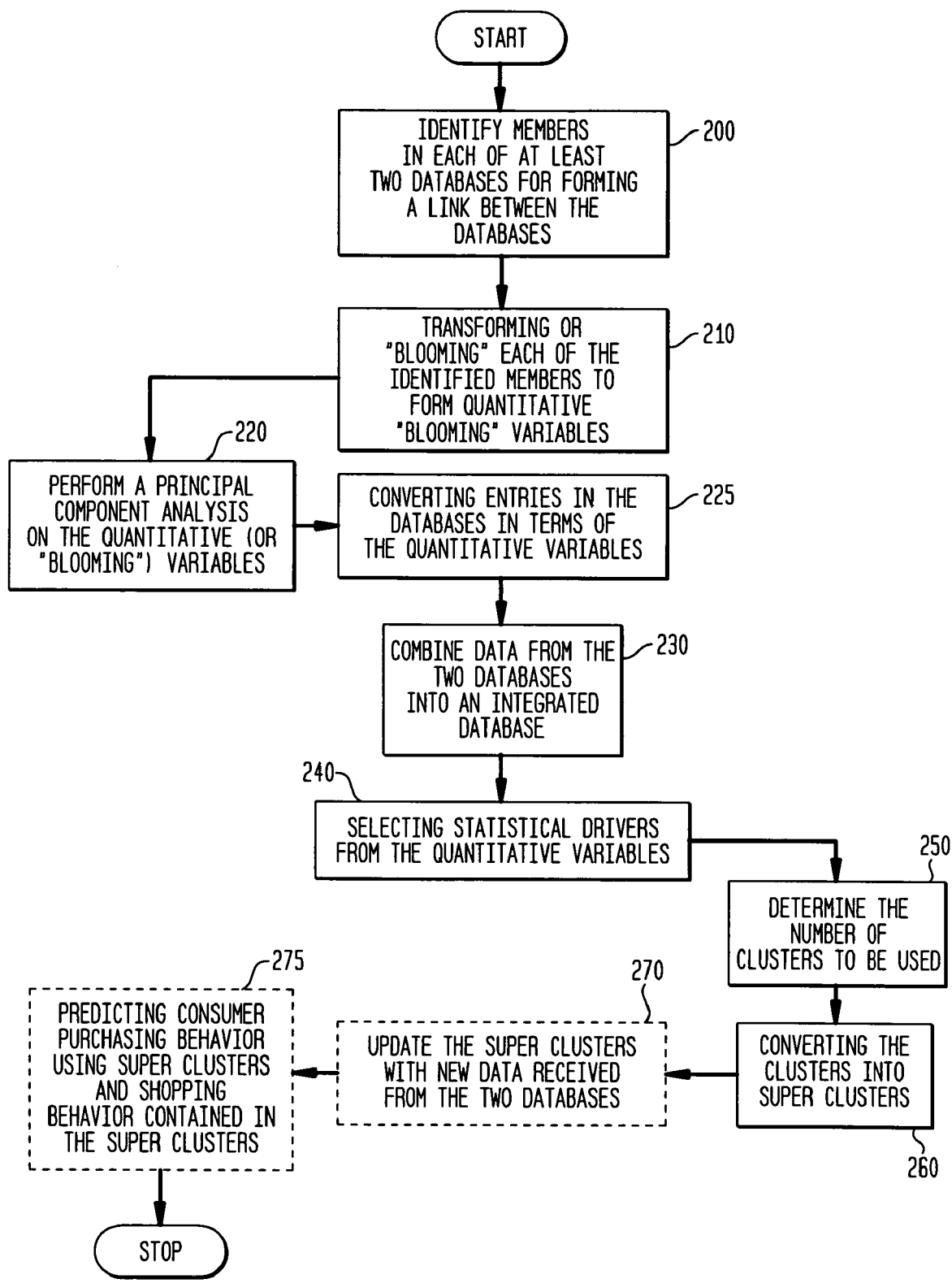
FIG. 3 shows an exemplary flowchart of an embodiment of a process according to the present invention which merges information from at least two databases.

FIG. 3 shows an exemplary embodiment of the process according to the present invention which merges/integrates information from at least two databases into an integrated database 55 and/or into one or more of these two databases, and possibly further consolidates the merged information. For example, this process can be executed by the integrating arrangement 10 shown in FIGS. 1 and 2. In step 200, "qualitative variables" are matched by identifying the same or similar members in the two databases 25, 35 (e.g., the MasterCard database and the Simmons database) and by forming a logical link between the databases 25, 35, 45. These members may be, for example, merchants for which information is stored in the databases 25, 35, 45. The exemplary behaviors and/or characteristics that can be measured include shopping and purchasing activities at each of the members (e.g., the merchants) which are provided in the databases 25, 35, 45. In step 210, the identified members are transformed using a "blooming" procedure to form "quantitative variables". For example, the blooming procedure according to the present invention may transform a qualitative variable (e.g., "I shopped at Macy's") into a quantitative variable (e.g., "I shopped at a store where the mean number of transactions per customer was 10.2, the mean transaction amount per purchase was $28.12"), and may utilize current information and/or historical information for the particular member.

Figure 4:
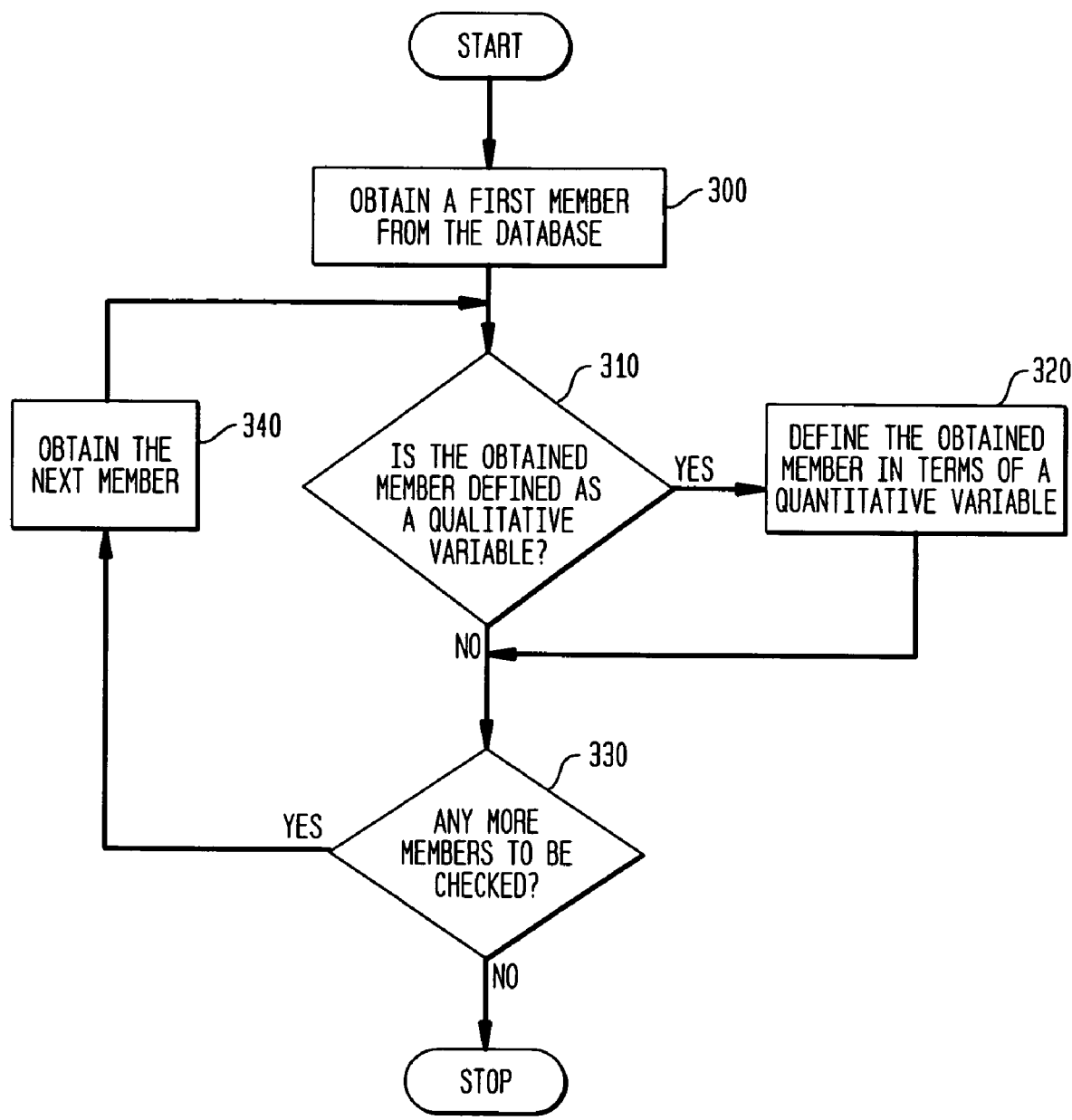
FIG. 4 shows a flowchart of an exemplary procedure for generating "blooming" variables according to the present invention.

An exemplary embodiment of the "blooming" procedure is illustrated by a flowchart in FIG. 4, in which a first identified member (e.g., the first merchant) is selected from the respective database 25, 35, 45 (step 300). Then, in step 310, the integrating arrangement 10 determines whether the obtained member is one which is defined in terms of a qualitative variable (i.e., a non-numerically related variable). If not, the process proceeds to step 330; and if so, the integrating arrangement 10 according to the present invention defines the obtained member in terms of a corresponding quantitative variable, i.e., a numerically related variable (step 320), and the process proceeds to step 330. In this step 330, the integrated arrangement 10 inquires if there are any more members to be checked from the respective database 25, 35, 45. If there are still members to be checked, the process obtains the next member (step 340), and returns to step 310. If not, the "blooming" procedure is stopped.

Using this exemplary procedure, it is possible to re-define (or "bloom") the members of the respective databases 25, 35, 45 in terms of numeric identifiers. For example, the "blooming" (or quantitative) variables may be a mean number of transactions per person for a particular merchant, a mean amount per transaction for that merchant, a mean household income of the shoppers shopping at that merchant, and four variables indicating the proportion of shoppers for that merchant from particular county sizes (e.g., Nielson counties). Thus, it is possible to uniquely locate and identify each of the members in, e.g., a 7-dimensional space. By forming the "blooming variables", it is possible to "widen" the narrow base of connectivity between the databases 25, 35, 45, as discussed herein. Instead of relying on a qualitative variable which is based on the presence or absence of shopping or purchasing behavior at a specific merchant, by utilizing the blooming variables, it is possible to use the quantitative variables so that the databases are associated and/or interconnected with multiple, substantively interpretable indicators which possess a higher level of measurement. It should be noted that the databases 25, 35, 45 do not necessarily have to contain information on the same individuals. Indeed, the process and system according to the present invention does not require data on the same individuals to be stored across the databases 25, 35, 45.

Figure 5:
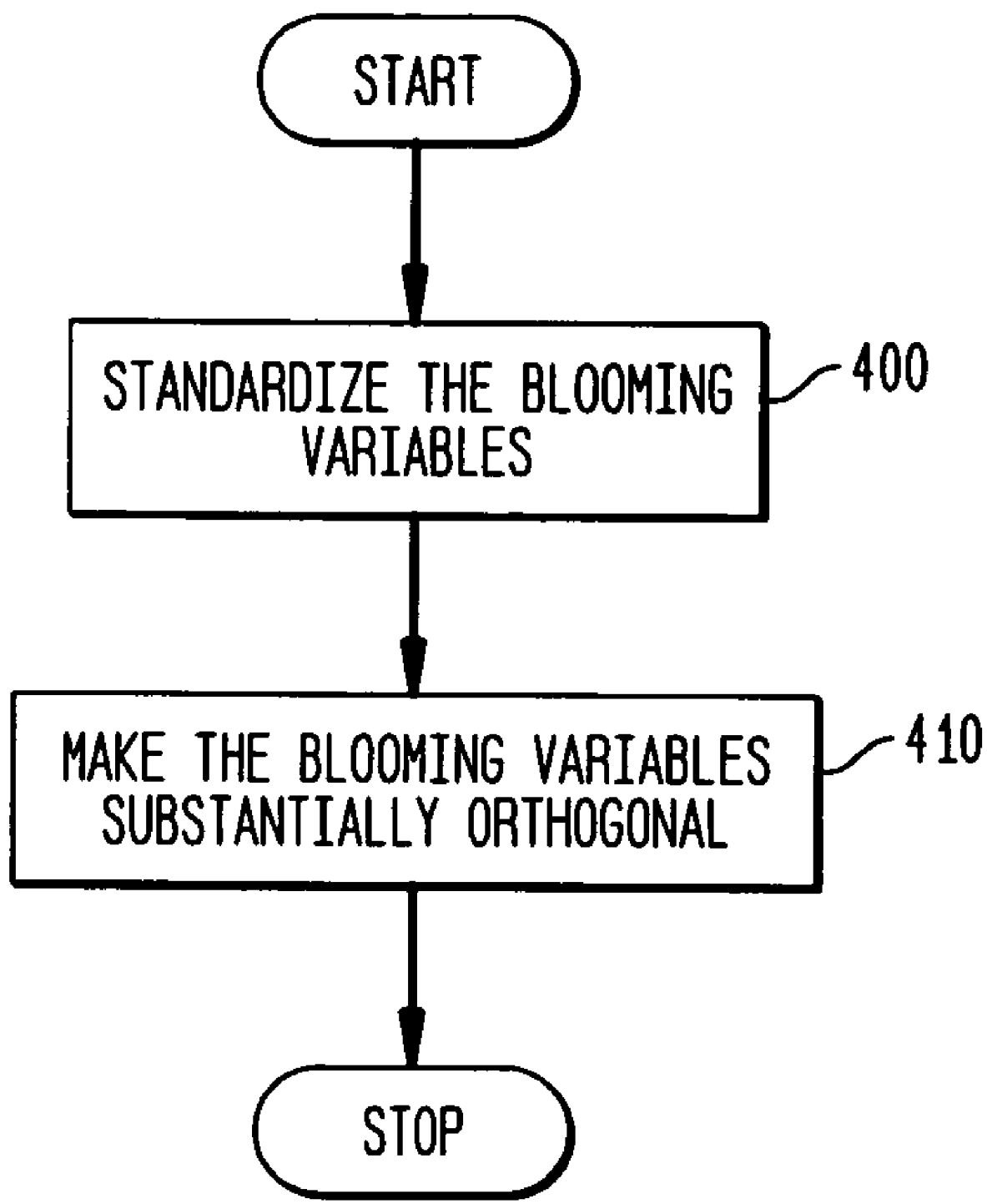
FIG. 5 shows a flowchart of an exemplary procedure of a principle component analysis performed on the blooming variables.

In step 220 of FIG. 3, a principal components analysis is performed on the blooming variables. An exemplary embodiment of this analysis is illustrated in FIG. 5. In particular, the blooming variables are standardized (step 400), and are then made to be substantially orthogonal (step 410). Using this analysis, it is possible to assign a particular weight to each of the blooming variables for indicating which of the blooming variables may provide information that is more useful than the information provided by other blooming variables. In this manner, the blooming variables of one database (e.g., the second database 35) can be adjusted to account for the differences in the transaction time periods between the databases (e.g., the second database 35 as compared to the first database 25 and/or the $N^{th}$ database 45).

In step 225 of FIG. 3, the entries (e.g., the behavior information of the respondents) in the databases 25, 35, 45 are coded in terms of the blooming variables. For example and as described above, a transaction in the first database 25 which indicates that the respondent made a particular purchase at a particular member (e.g., at a department store) can be transformed into a data point that is defined as the particular purchase at the merchant which has the following characteristics:

(1) the mean number of transactions was a particular amount (e.g., 10.2), (2) the mean transaction amount per purchase was equal to the amount of the particular purchase, (3) the mean household income of a shopper at that merchant was another number (e.g., $54,300), and (4) four other mean numbers for indicating the proportion of shoppers for each county size A, B, C and D.

Similarly, the respondent in the second database 35 who indicated that he shopped at the same member for a particular number of times in, e.g., the last 30 days is also coded to indicate that this particular respondent shopped the particular number of times at the merchant where the mean number of transactions was equal to the amount in the first database 25, the mean transaction amount per purchase was equal to the particular amount, and the mean household income of a shopper at that merchant was, e.g., $54,300.

Then, in step 230 of FIG. 3, the databases 25, 35, 45 can be integrated into one database 55. The further steps of FIG. 3 discussed below can preferably be performed on such integrated database 55. It is also possible to merge the data from the databases 25, 35, 45 into one or more of these databases 25, 35, 45.

In addition, after the integrated database is formed from the databases 25, 35, 45, the number of members (e.g., merchants) in the integrated 55 database can be condensed, using the integrating arrangement 10, and "statistical drivers" can preferably be selected from the blooming variables which reside in the integrated database 55 (step 240). For example, the statistical drivers may include a subset of members that had the most discriminatory power (e.g., department stores as compared to grocery stores), and as such, these members may provide the values for the blooming variables discussed above.

Figure 6:
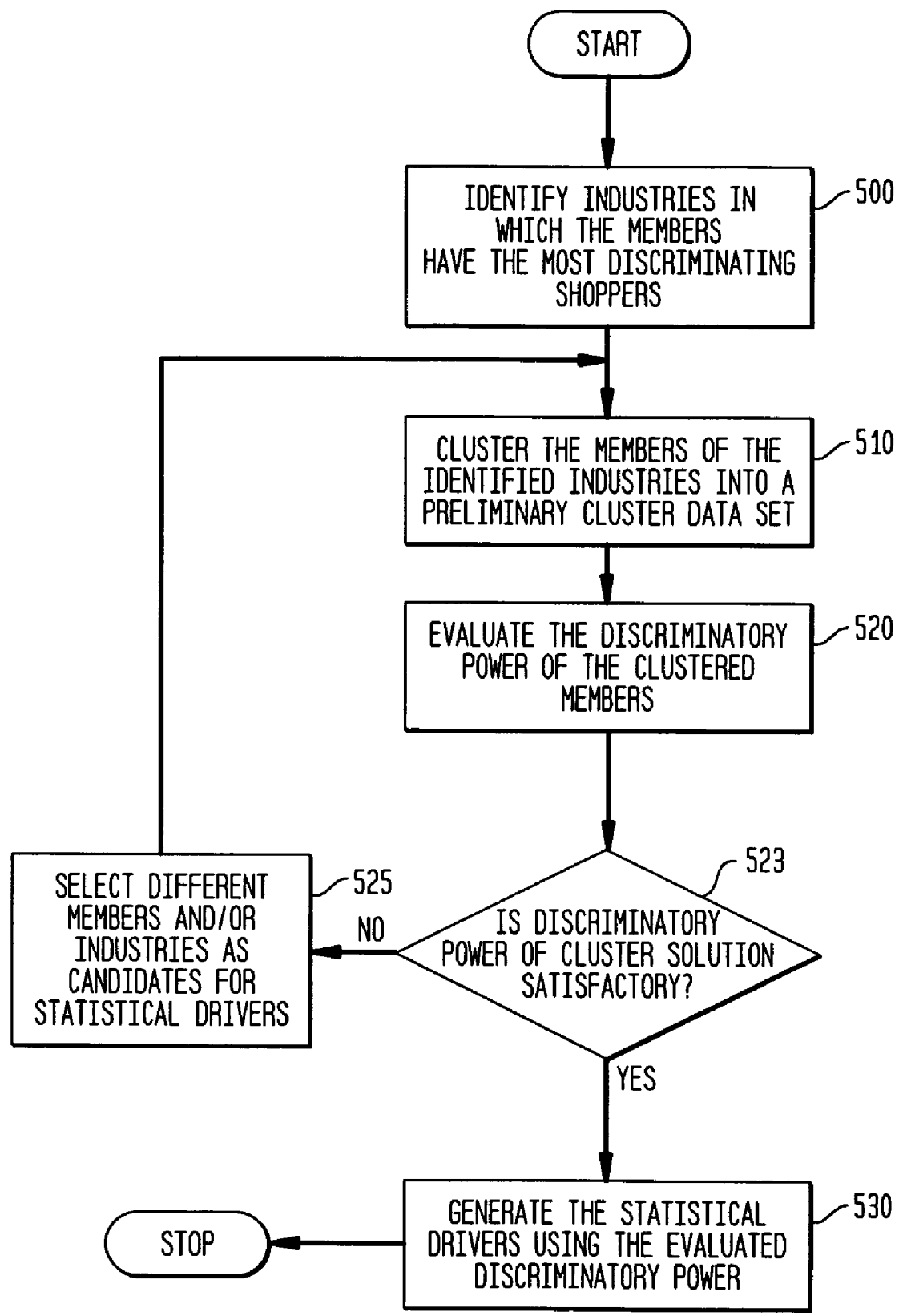
FIG. 6 shows a flowchart of an exemplary procedure of an identification process for selecting statistical drivers.

An exemplary embodiment of the process to select statistical drivers is illustrated by the flowchart in FIG. 6. In particular, the industries in which the members have the most discriminating shoppers are first identified (step 500). Then, the members of the identified industries are clustered into a preliminary cluster data set (step 510), and the discriminatory power of the clustered members is evaluated as a set according to, e.g., the root mean squared standard ("RMSSTD") statistic, and as an estimated $R^2$ for the model (step 520). This evaluation can be performed using conventional statistical software as would be known by one skilled in the art. For example, the "FASTCLUS" procedure of the "SAS" statistical software can be utilized for this procedure. Thereafter, in step 523, the process and the integrating arrangement 10 according to the present invention determine if the discriminatory power of a cluster solution is satisfactory. If not, different members and/or industries are selected as the candidates for the statistical drivers (step 525), and the procedure is returned to step 510. Otherwise, the statistical drivers are generated using the discriminatory power of the evaluated cluster, (step 530), and the procedure in FIG. 6 is completed.

In step 250, the number of clusters (e.g., the exact number of the clusters) to be used for consolidating the information from the databases 25, 35, 45 is determined by the integrating arrangement 10. This determination can be made using, e.g., the "FASTCLUS" procedure. For example, using the estimated $R^2$ for the model, a cubic clustering criteria, the pseudo t statistics and the pseudo F statistics, procedures known in the art, an optimal number of the clusters can be determined.

Figure 7:
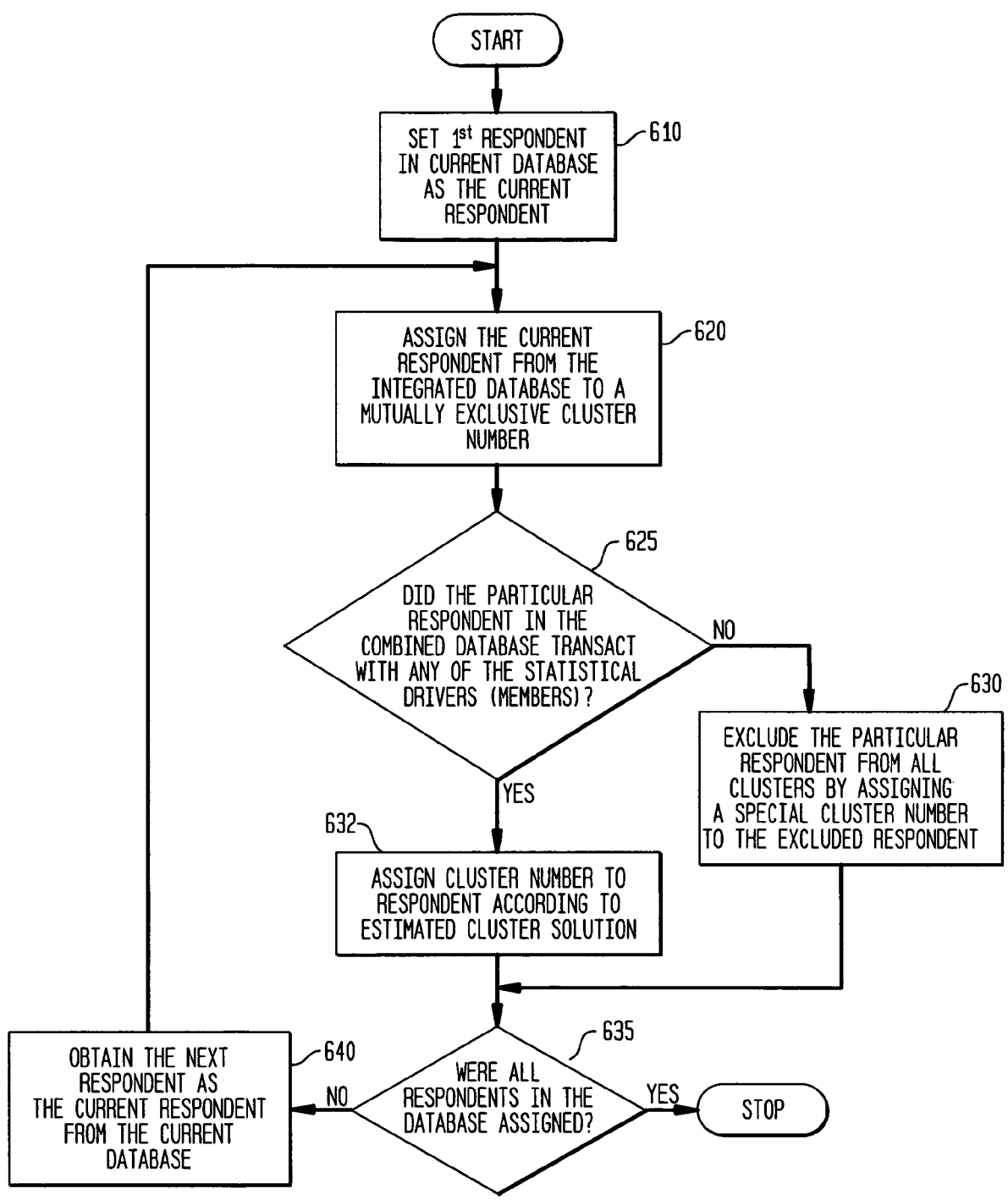
FIG. 7 shows a flowchart of an exemplary procedure for determining a number of clusters to be used in accordance with the present invention.

One exemplary embodiment of such determining procedure is illustrated in the flowchart of FIG. 7. In this exemplary embodiment, the first respondent of the integrated database 55 is set as the current respondent (step 610). Then, in step 620, the current respondent is assigned to a mutually exclusive cluster number. The integrating arrangement 10 determines whether the current respondent in the integrated database 55 transacts with any of the members (e.g., the merchants) which are assigned as the "statistical drivers" (step 625). If so, the process continues to step 632, where a cluster number is assigned to the current respondent according to the estimated cluster solution. Then, the integrating arrangement 10 determines if all respondents in the integrated database 55 were appropriately assigned (step 635). If the current respondent does not transact with any of the "statistical drivers", the current respondent is excluded from all clusters by assigning a special cluster number (e.g., zero) to that particular respondent (step 630), and the process continues to step 635. If all of the respondents of the integrated database 55 were not yet assigned, the integrating arrangement 10 obtains the next respondent in the integrated database 55 to be the current respondent (step 640), and returns the processing to step 620. Otherwise, the exemplary embodiment of the determining procedure of FIG. 7 is completed.

Thereafter, in step 260 of FIG. 3, the determined clusters are preferably consolidated (or converted) into further clusters (e.g., the "super clusters"). For example, this consolidation/conversion of clusters into super clusters may be performed using the procedures provided by conventional software packages. In one exemplary implementation of the process according to the present invention, the clusters are consolidated/converted into the super clusters using the "CLUSTER" procedure of the "SAS" software by utilizing the known "Ward's" method. It is also possible to utilize the estimated $R^2$ of the model, the cubic clustering criteria, the pseudo t and pseudo F statistics to determine the optimal number of the super clusters. According to the process of the present invention described above, each cluster of a particular group of the clusters (and all its associated members) are assigned to a single supercluster.

It is also possible to periodically update the integrated database 55 to reassign the unassigned respondents to a particular cluster (step 270) when utilizing the process and system of the present invention. For example, if the respondent in the integrated database 55 who was excluded from any cluster (i.e., assigned to a cluster number of zero) was found to have transacted with one or more of the merchants assigned as the "statistical drivers," this respondent can be reassigned to a particular cluster according to, e.g., a "nearest neighbor" strategy. Using the nearest neighbor strategy, the previously unassigned respondent is assigned to the cluster whose centroid is nearest to the particular unassigned respondent in a multi-dimensional space. In step 275, the integrating arrangement 10 and the integrated database 55 can then be used to predict consumer purchasing behavior with the super clusters and the shopping behavior data contained therein.

According to another embodiment of the present invention, after the super clusters (e.g., the shopping clusters) are formed, other characteristics of the consumer and media behavior of such super clusters which are not the statistical drivers (e.g., the "descriptors") can then be used to further describe the cluster. Using conventional statistical summarization techniques, it is possible to utilize these "descriptors" to provide additional information regarding the consumer and media behaviors of the respondents in the integrated database 55.

Thus, the process and system according to the present invention is capable of combining two or more market research databases to associate data maintained within each one, at least one of which may be a transactional database. Indeed, the system can identify driver variables that are bloomed into characteristics which uniquely identify merchants within a multidimensional space. This process and system enable a construction of consumer webs for each respondent within the database, and the respondents within each database are merged into shopping clusters that are homogenous in terms of a consumer behavior. Therefore, the process and system of the present invention can utilize a previous consumer behavior to predict the behavior of the respondent (e.g., the consumer) in the future. Contrary to the prior art processes and systems which relied on the demographic characteristics of the consumers to predict their respective shopping behaviors, the process and system of the present invention may utilize distinct shopping and purchasing patterns of the consumers to form joint shopping clusters which can be shared across the databases to be integrated. Accordingly, a much more accurate and predictive model of the future consumer behavior can be produced, since there is a stronger correlation between the consumer behavior variables of the databases being integrated.

Figure 8:
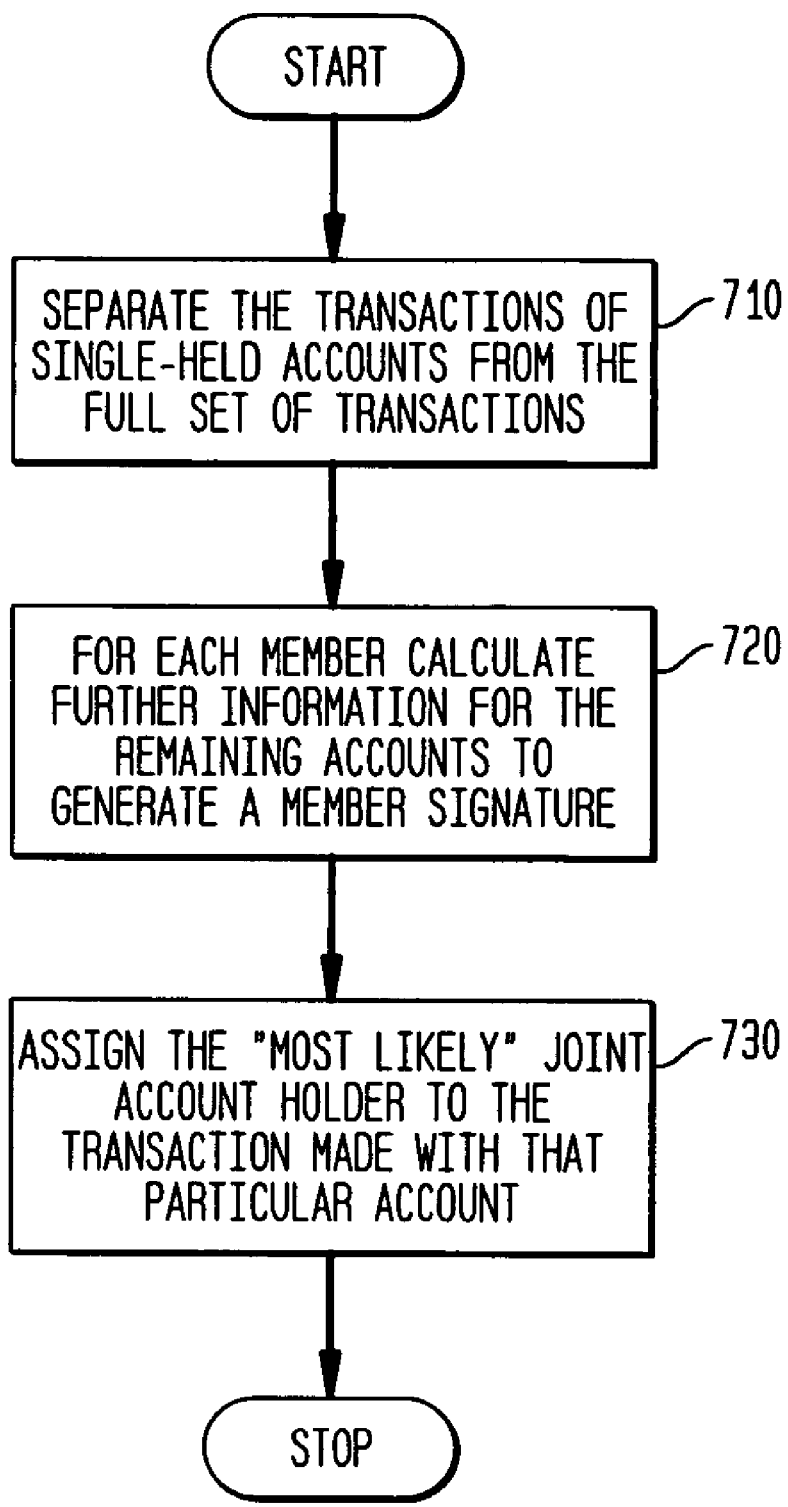
FIG. 8 shows a first portion of an exemplary procedure in accordance with the present invention.
Figure 9:
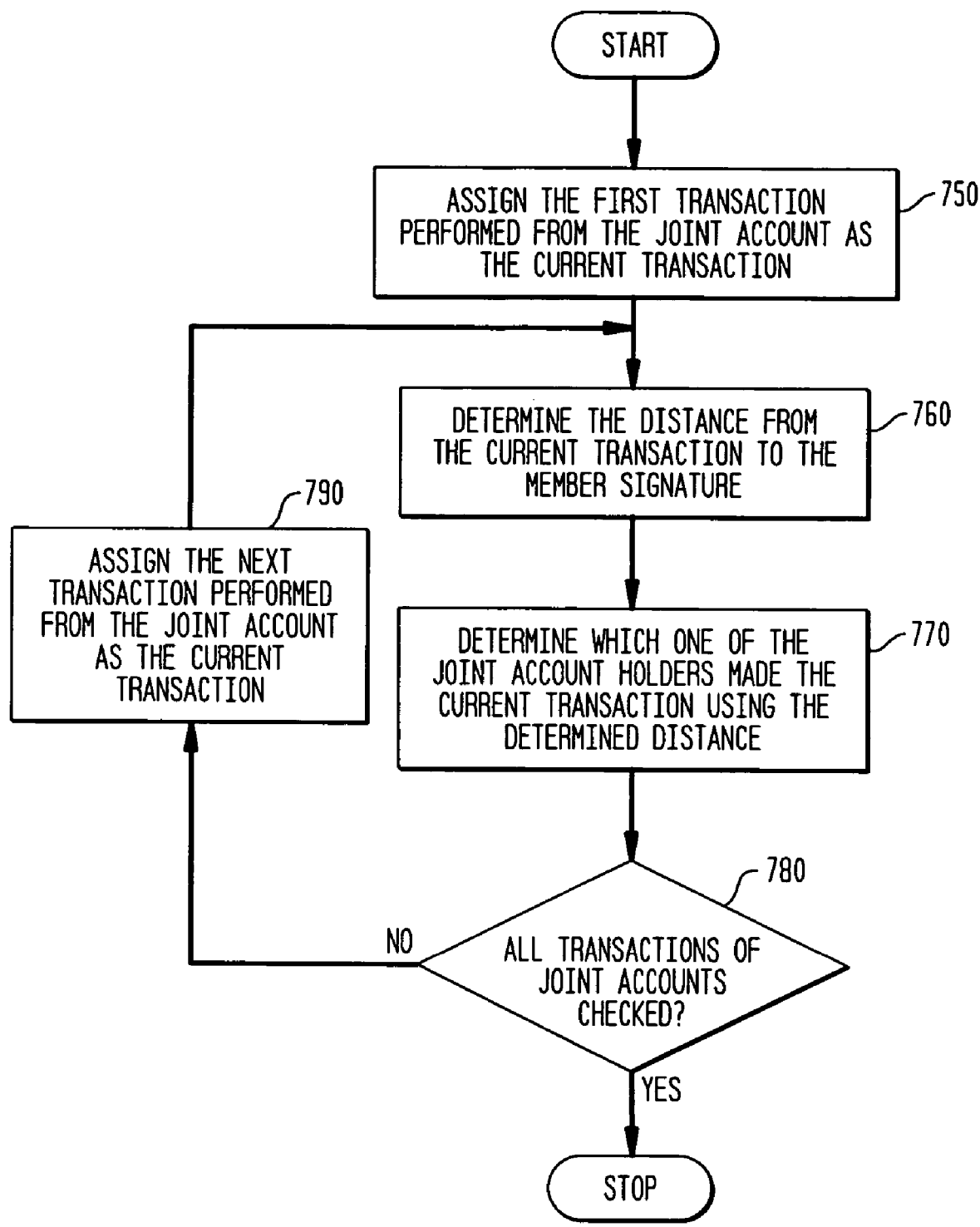
FIG. 9 shows a second portion of an exemplary procedure in accordance with the present invention.

FIGS. 8 and 9 show an exemplary procedure for determining which individual of joint account holders (i.e., an account issued by the merchant or the credit issuing agency) executed a particular transaction. For example, when two or more individuals have a joint account, it is preferable to assign the transactions made using that account to a specific joint owner of such account. The known attributes of the users of the joint account that distinguish the particular individuals within a household may include known age, income, and gender of each cardholder, but usually not which one of the joint account holders executed the particular transaction. Therefore, all three of these attributes can be used to assign a specific transaction for joint accounts to the particular individual of that joint account.

Thus, to assign the proper individual of the jointly held account to a particular transaction, the transaction of individuals holding non-joint accounts are separated from the full list of transactions (step 710). Then, for each member, further information (e.g., a mean age, a mean personal income, a proportion of males) is calculated for the remaining accounts, and standard deviations of age and income can be calculated (step 720). Such calculations generate a member signature with which the individual of the joint account (who is most likely the one who executed the particular transaction) can be assigned to that particular transaction (step 730).

Then, as shown in FIG. 9, the first transaction made from the joint account is assigned as the current transaction (step 750). A relative distance from the current transaction to the member signature is determined (step 760), and the system (e.g., the integrating arrangement 10) according to the present invention determines which one of the joint account holders made the current transaction (step 770). For example, the individual whose relative distance to the member's signature point is the closest can be assigned to the particular transaction. If all transactions of the joint account holders were checked in step 780, then the above-described procedure is terminated. Otherwise, the next transaction made from one of the remaining joint accounts is assigned as the current transaction, and the process is returned to step 760. An L1 norm (e.g., a "taxicab metric"), rather than an L2 norm (e.g., a Euclidean distance), can be used to de-emphasize the outlier effects for the calculation of the relative distance.

This exemplary procedure for determining which individual of the joint account holders executed a particular transaction can be used in the process according to the present invention shown in FIG. 3. For example, the procedure shown in FIGS. 8 and 9 may be utilized for databases 25, 35, 45 prior to step 200 of FIG. 3 so that the system and process according to the present invention can take into account which individual of the jointly-held account made a particular transaction.

One of the advantages of the system and process according to the present invention is that it is possible to obtain a better model of a future behavior of the customers which may be extremely useful for numerous entities (e.g., advertising agencies, retailers, their customers, etc.). This system and process allows for a better estimation of the behavior of the potential customers which are provided in the same clusters. For example, if the particular customers are assigned to the same cluster because they shopped in the department store identified in that cluster, they like to watch the same television show, they like to go to the movie theater on weekends, etc., it is significantly easier to predict that the behavior of these customers would be similar in other situations (e.g., where they travel on vacations, etc.). Thus, by enabling an easier prediction of the future transactions/decisions of such customers, information (e.g., marketing materials) which are most suitable for such predicted transactions/decisions can be provided to them in the most effective manner.

It should be appreciated that those skilled in the art will be able to devise numerous systems and processes which, although not explicitly shown or described herein, embody the principles of the invention, and are thus within the spirit and scope of the present invention.

We claim:

1. A computerized method for predicting individual behavior from information stored in a plurality of separate and disparate databases, the method comprising:

accessing a first database of the plurality of separate and disparate databases, the first database comprising a first plurality of records respectively associated with a first plurality of consumers, wherein the first plurality of records each comprise a first plurality of data variables associated with survey data provided from the respective of the first plurality of consumers;

accessing a second database of the plurality of separate and disparate databases, the second database comprising a second plurality of records associated with a second plurality of consumers, wherein the second plurality of records each comprise a second plurality of data variables associated with transactions of respective of the second plurality of consumers;

wherein the first plurality of data variables includes data variables that are not included in the second plurality of data variables, and wherein at least some consumers of the second plurality of consumers are not in the first plurality of consumers;

identifying a data variable which is common to the first data variables and the second data variables, wherein identifying the data variable comprises identifying at least one qualitative variable which is common to each database of the plurality of separate and disparate databases and transforming the at least one qualitative variable into one or more quantitative variables;

using a processing device, performing a cluster analysis across all separate databases, of the plurality of separate and disparate databases, using the common data variable from each database of the plurality of separate and disparate databases to form a plurality of clusters, at least one cluster of the plurality of clusters containing at least some of the first plurality of consumers and at least some of the second plurality of consumers that are not in both the first and second databases;

using a processing device, forming an integrated database by linking the plurality of clusters through the plurality of separate and disparate databases;

using a processing device, creating a behavioral model, using corresponding data of the plurality of clusters of the integrated database, for predicting individual behavior of respective of the second plurality of consumers.

2. The method of claim 1, further comprising:
selecting at least one discriminating subset of the one or more quantitative variables to create one or more statistical drivers; and
evaluating a plurality of individuals represented in the plurality of separate and disparate databases using the one or more statistical drivers.

3. The method of claim 2, wherein the selecting step further comprises:
identifying one or more industries which have discriminating consumers and grouping selected merchants into the at least one discriminating subset.

4. The method of claim 1, further comprising:
converting one or more clusters of the plurality of clusters into at least one super cluster; and
assigning the plurality of individuals to a corresponding cluster or super cluster using data from each database of the plurality of separate and disparate databases.

5. The method of claim 1, wherein the at least one qualitative variable is a merchant and the one or more quantitative variable comprises one or more of the following:
mean number of transactions per person for the merchant,
mean amount per transaction for the merchant,
mean household income of shoppers shopping at the merchant, or
mean proportion of the shoppers for a particular area of the merchant.

6. The method of claim 1, further comprising:
prior to forming the integrated database, weighting data of the plurality of separate and disparate databases to adjust for differences in size and in time encompassed.

7. The method of claim 1, wherein the information stored in at least one database of the plurality of separate and disparate databases further comprises consumer transactional information and has instances of purchasing behavior by consumers.

8. The method of claim 7, wherein at least one of the separate and disparate databases includes joint account information for at least two consumers, and wherein the method further comprises:
determining a consumer of the at least two consumers who generated at least a portion of the consumer transactional information.

9. A system for predicting individual behavior from information stored in a plurality of separate and disparate databases, the system comprising:
a data interface configured to access a first database of the plurality of separate and disparate databases having at least a first plurality of records respectively associated with a first plurality of individuals, wherein the first plurality of records each comprise a first plurality of data variables associated with survey data provided from the respective of the first plurality of individuals, the data interface being further configured to access a second database of the plurality of separate and disparate databases having at least a second plurality of records respectively associated with a second plurality of individuals, wherein the second plurality of records each comprise a second plurality of data variables associated with transactions of respective of the second plurality of individuals, and wherein at least some of the first plurality of data variables are not contained in the second plurality of data variables and the first database comprises information for at least a plurality of individuals who are not contained in the second database, the system comprising:
a storage device adapted to store an integrated database; and
a processing device coupled to the storage device, the processing device adapted to perform a cluster analysis across all separate databases, of the plurality of separate and disparate databases, using at least one variable which is common to each database of the plurality of separate and disparate databases to form a plurality of clusters, at least one cluster of the plurality of clusters containing at least some individuals of the first and second databases who are not in both the first and second databases, the processing device further adapted to form the integrated database by linking through the plurality of clusters the plurality of separate and disparate databases, and to generate a behavioral model, using corresponding data of the plurality of clusters of the integrated database, for predicting individual behavior, wherein the processing device is further adapted to transform at least one qualitative variable, which is common to each database of the plurality of separate and disparate databases, into one or more quantitative variables.

10. The system of claim 9, wherein the processing device is further adapted to determine at least one discriminating subset of the one or more quantitative variables to form one or more statistical drivers, and to evaluate a plurality of individuals represented in the plurality of separate and disparate databases using the one or more statistical drivers.

11. The system of claim 10, wherein the processing device is further adapted to select the at least one discriminating subset by identifying one or more industries which have discriminating consumers, and further adapted to group selected merchants into the at least one discriminating subset.

12. The system of claim 9 wherein the at least one qualitative variable is a merchant and the one or more quantitative variable comprises one or more of the following:
mean number of transactions per person for the merchant,
mean amount per transaction for the merchant,
mean household income of shoppers shopping at the merchant, or mean proportion of the shoppers for a particular area of the merchant.

13. The system of claim 9, wherein the processing device is further adapted, prior to the formation of the integrated database, to weight data of the plurality of separate and disparate databases to adjust for differences in size and in time encompassed.

14. The system of claim 9, wherein the processing device is further adapted to convert one or more clusters of the plurality of clusters into at least one super cluster, and to assign the plurality of individuals to a corresponding cluster or super cluster using data from each database of the plurality of separate and disparate databases.

15. The system of claim 9, wherein the information stored in the plurality of separate and disparate databases further comprises one or more of the following types of information: consumer transactional information; instances of purchasing behavior by consumers; survey information; self-reported behavioral information; or media behavior.

16. The system of claim 15, wherein at least one of said separate and disparate databases includes joint account information for at least two consumers, and wherein the processing device is further adapted to determine a consumer of the at least two consumers who generated at least a portion of the consumer transactional information.

17. A method for creating a behavioral model from information stored in a plurality of separate and disparate databases, a first database of the plurality of separate and disparate databases having at least a plurality of data variables that are not contained in a second database of the plurality of separate and disparate databases, and the first database containing information for at least a plurality of individuals who are not contained in the second database, the method comprising:

determining a plurality of variables from each separate database, at least a portion of the plurality of variables common to each separate database of the plurality of separate and disparate databases, wherein the determining comprises selecting at least one qualitative variable which is common to each separate database of the plurality of separate and disparate databases and transforming the at least one qualitative variable from each separate database to a plurality of quantitative variables;

using a processing device, performing a first cluster analysis across all separate databases, of the plurality of separate and disparate databases, using corresponding data of the plurality of variables common to each separate database of the plurality of separate and disparate databases to create a plurality of cluster solutions, at least a first cluster solution of the plurality of cluster solutions containing at least some individuals of the first and second databases who are not in both the first and second databases;

using a processing device, linking information stored in the plurality of separate and disparate databases according to the first cluster solution, of the plurality of cluster solutions, the information stored in at least the first and the second separate and disparate databases; and validating the first cluster solution of the plurality of cluster solutions as a discriminatory behavioral model for predicting individual behavior.

18. The method of claim 17, further comprising:
performing a principal components analysis on the plurality of quantitative variables using the information stored in each separate database of the plurality of separate and disparate databases to create a plurality of statistical drivers.

19. The method of claim 18, further comprising:
converting the information stored in the plurality of separate and disparate databases according to the plurality of statistical drivers to create the corresponding data of the plurality of variables.

20. The method of claim 18, wherein the validation step further comprises:
determining whether the cluster solution provides corresponding discrimination on a plurality of other variables which are not statistical drivers in the plurality of separate and disparate databases.

21. The method of claim 18, further comprising:
standardizing the plurality of quantitative variables;
transforming the standardized plurality of quantitative variables to be substantially orthogonal; and
differentially weighting the orthogonal, standardized plurality of quantitative variables to form the plurality of statistical drivers.

22. The method of claim 17, further comprising:
evaluating corresponding discrimination power of the plurality of statistical drivers using a second cluster analysis.

23. The method of claim 17, wherein at least one separate database of the plurality of separate and disparate databases stores one or more of the following types of information: behavioral and attitudinal information; consumer transactional information; and media consumption information.

24. The method of claim 17, further comprising:
describing each cluster of a plurality of clusters of the validated simultaneous cluster solution using information stored in at least one separate database of the plurality of separate and disparate databases.

25. The method of claim 17, wherein the validation step further comprises:
determining whether the cluster solution provides corresponding discrimination separately within each separate database of the plurality of separate and disparate databases.

26. A system for creating a behavioral model from information stored in a plurality of separate and disparate databases, a first database of the plurality of separate and disparate databases having at least a plurality of data variables associated with survey data provided from the respective of the first plurality of consumers, the first plurality of data variables having at least some data variables that are not contained in a second database of the plurality of separate and disparate databases having a second plurality of data variables associated with transactions of respective of the second plurality of consumers, and the first database containing information for at least a plurality of individuals who are not contained in the second database, the system comprising:

a storage device storing data from one or more of the plurality of separate and disparate databases; and a processing device coupled to the storage device, the processing device adapted to determine a plurality of variables from each separate database, at least a portion of the plurality of variables common to each separate database of the plurality of separate and disparate databases, wherein the plurality of variables are determined by selecting at least one qualitative variable which is common to each separate database of the plurality of separate and disparate databases, and transforming the at least one qualitative variable from each separate database to a plurality of quantitative variables;

to perform a first cluster analysis across all separate databases, of the plurality of separate and disparate databases, using corresponding data of the plurality of variables common to each separate database of the plurality of separate and disparate databases to create a plurality of cluster solutions, at least one cluster solution of the plurality of cluster solutions containing at least some individuals of the first and second databases who are not in both the first and second databases;

to link through a cluster solution, of the plurality of cluster solutions, the information stored in the plurality of separate and disparate databases; and to validate the cluster solution of the plurality of cluster solutions as a discriminatory behavioral model for predicting individual behavior.

27. The system of claim 26, wherein the processing device is further adapted to perform a principal components analysis on the plurality of quantitative variables using the information stored in each separate database of the plurality of separate and disparate databases to create a plurality of statistical drivers.

28. The system of claim 27, wherein the processing device is further adapted to convert the information stored in the plurality of separate and disparate databases according to the plurality of statistical drivers to create the corresponding data of the plurality of variables.

29. The system of claim 27, wherein the processing device is further adapted to validate the cluster solution by determining whether the cluster solution provides corresponding discrimination on a plurality of other variables which are not statistical drivers in the plurality of separate and disparate databases.

30. The system of claim 27, wherein the processing device is further adapted to standardize the plurality of quantitative variables; transform the standardized plurality of quantitative variables to be substantially orthogonal; and to differentially weight the orthogonal, standardized plurality of quantitative variables to form the plurality of statistical drivers.

31. The system of claim 27, wherein the processing device is further adapted to evaluating a corresponding discrimination power of the plurality of statistical drivers using a second cluster analysis.

32. The system of claim 26, wherein at least one separate database of the plurality of separate and disparate databases stores one or more of the following types of information; behavioral and attitudinal information; consumer transactional information; and media consumption information.

33. The system of claim 26, wherein the processing device is further adapted to determine whether the cluster solution provides corresponding discrimination separately within each separate database of the plurality of separate and disparate databases.

34. The computerized method of claim 1, wherein the data variables associated with transactions of respective of the second plurality of consumers comprise data variables associated with purchasing transactions.

35. The computerized method of claim 1, wherein the data variables associated with transactions of respective of the second plurality of consumers comprise data variables associated with media viewing transactions.

* * * * *